United States Patent Office 3,458,465
Patented July 29, 1969

3,458,465
LAMINATE, BINDING SOLUTION AND PROCESS FOR PREPARATION OF LAMINATE
Kurt Rehnelt, Dusseldorf-Holthausen, and Manfred Voss, Hilden, Rhineland, Germany, assignors to Henkel & Cie, G.m.b.H., Dusseldorf-Holthausen, Germany, a corporation of Germany
No Drawing. Filed Mar. 17, 1966, Ser. No. 535,020
Claims priority, application Germany, Mar. 25, 1965, H 55,571
Int. Cl. C08g *37/22;* B32b *27/42, 29/02*
U.S. Cl. 260—29.4          7 Claims

ABSTRACT OF THE DISCLOSURE

This invention relates to an aqueous bonding solution consisting essentially of (1) an aqueous solution of a melamine-formaldehyde precondensate, said precondensate having a mol ratio of melamine to formaldehyde of about 1:1.5 to 1:2.5 and a precipitation point of from about 10 to 1, (2) from about 2% to 20% by weight, based on the solid precondensate content, of a polyvinyl alcohol having a saponification number of from 50 to 250, and (3) from about 1% to 10% by weight, based on the weight of the above mixed precondensate solution of a lower poly-hydric alcohol having from 2 to 6 carbon atoms, said bonding solution containing from about 20% to 60% by weight of water. The invention also relates to the process of preparing laminates utilizing the aforesaid bonding solution and to the laminates so produced.

THE PRIOR ART

It is known to use polyvinyl alcohol concomitantly in the condensation of melamine with formaldehyde. The partial condensates thus obtained are suitable for the preparation of laminates; however, the laminates obtained are not readily removed from the hot sheets used to press the laminates.

It is also known to add polyvinyl alcohol, as a thickening agent, to melamine-resin solutions for the purpose of adjusting these solutions to a specific viscocity.

Furthermore, melamine-resins have been modified by adding poly-hydric alcohols during condensation, thereby effecting a favorable influence on the flow capability and other characteristics of the finished resins. The condensation is performed under such conditions, that the poly-hydric alcohol is chemically absorbed in the resin.

The melamine resins obtained according to the aforementioned prior art processes exhibit various disadvantages when used as binding agents for laminated materials. For example, the transparency of the surface is frequently not at all satisfactory. Moreover, the surfaces often show poor crack resistance. In addition, adherence of the still warm, laminated articles to the press plates is frequently observed.

OBJECTS OF THE INVENTION

Accordingly, it is an object of this invention to provide a novel process for preparing laminates, wherein the laminate surfaces are transparent, crack resistant and do not adhere to the press plates.

Another object of this invention is to provide a novel melamine resin binding solution, which solution has utility for preparing high quality laminates.

A further object of this invention is to provide novel laminates, which laminates have transparent and crack resistant surfaces which do not adhere to the press plates.

The aforementioned and other objects and advantages will become apparent as the description of the invention proceeds.

DESCRIPTION OF THE INVENTION

Accordingly, the present invention is characterized in that papers are saturated with an aqueous binding solution consisting essentially of a melamine resin precondensate, a polyvinyl alcohol with residual acetyl groups having a saponification number of 50 to 250, and a lower poly-hydric alcohol. After complete impregnation with the aqueous solution, the papers are dried in the usual manner and pressed onto conventional sheets.

The resin for the binding solution may be prepared from aqueous liquors of melamine and formaldehyde precondensates or dry melamine-formaldehyde resin precondensate can be dissolved in water. The ratio of melamine to formaldehyde in the resin should be from about 1:1.5 to 1:2.5 and the solution should have a resin content of about 50% by weight. When preparing the resin from aqueous liquors of melamine and formaldehyde, condensation is effected at a pH value of 7 to 10 and at a temperature of about 60 to 100° C., up to a precipitation point of about 10 to 1. To the extent that the melamine-formaldehyde resins, per se, and their method of preparation are well known in the art, no claim is made thereto.

To the aqueous melamine-formaldehyde solution, about 2 to 20% by weight, preferably 5 to 15%, of polyvinyl alcohol, based on solid melamine-resin, is added. The polyvinyl alcohol has a residual content of acetyl groups corresponding to a saponification number of 50 to 250. Advantageously, the polyvinyl alcohol is added in the form of a 30 to 50% aqueous solution. The polyvinyl alcohol with residual acetyl groups may have a viscosity of about 3 to 50 cp. in 4% solution at a temperature of 20° C. The viscosity is determined according to the Epprecht method (see "Kolloid Zeitschrift" 1955, volume 144, pages 116–118). The manner of preparing the polyvinyl alcohol is well known in the art and forms no part of this invention.

The melamine-formaldehyde solution further contains about 1 to 10% by weight of a lower poly-hydric alcohol, based on the resin resolution. Poly-hydric lower alcohols which may be used are, for example, propanediol, butanediol, glycerin, diethylene glycol, triethylene glycol, mannitol and sorbitol and ethylene glycol. It is preferred to use ethylene glycol. The poly-hydric alcohols may have from about 2 to 6 carbon atoms.

The binding solution containing the resin, polyvinyl alcohol and poly-hydric alcohol advantageously contains about 60 to 20% by weight, and preferably about 50% water. The solution may be prepared by adding the ingredients in any order.

Papers which may be utilized for impregnation purposes are those weighing from about 15 gm. to 150 gm./m.$^2$. Consequently, on the one hand, so-called overlay-tissue papers, (bleached or unbleached) weighing about 15 to 50 gm./m.$^2$ can be used, or so-called decorative papers, which as a rule have a weight of about 70 to 150 gm./m.$^2$, may be used. The decorative papers may be filled or unfilled and may contain printing.

The impregnation of the papers is carried out advantageously in conventional devices generally used for this purpose and employing a continuous operation method. The temperature of the impregnation solution may be 10 to 60° C., preferably 20 to 40° C. It is also possible to impregnate the papers in batches.

The concentration of the impregnation solution, the temperature and other conditions required for the procedure are adjusted in such manner, that on the so-called overlay-papers a resin coat of 200 to 400% of the paper weight is present after the drying, and on the decorative papers a coat of 80 to 200%, based on the weight of the respective paper, is present.

After the impregnation is completed, the moist papers are dried by means of warm air having a temperature between 80 and 150° C. If necessary, they are dried again after a pre-drying with infra-red radiation. The dried papers can be pressed immediately thereafter. On the other hand, as the impregnated papers are stable, they may be stored for a considerable length of time before being pressed.

For the actual preparation of the laminates, the dried impregnated papers are pressed onto sheet materials such as woodchip mold plate, plywood, solid wood or even other laminates, which are bonded with other condensation resins, for example, phenol resins.

The process of pressing is accomplished at a relatively low pressure of about 5 to 20 kg./cm.$^2$, preferably 6 to 13 kg./cm.$^2$ and at a temperature of 120 to 200° C., in particular 130 to 180° C. Under these conditions, press periods lasting about one half minute to 30 minutes, preferably 1 minute to 15 minutes, are required. The conditions for the press process will vary with the degree of condensation of the melamine formaldehyde-resin and with the amount and the nature of the polyvinyl alcohol.

The laminates can be removed, without any re-cooling, from the press and directly after their preparation may be solidified to such a degree that they can be subjected to further mechanical processing. The surfaces of the laminate exhibit satisfactory transparency and abrasion stress resistance. It is of particular advantage that according to this invention, the pressing can be performed at relatively low pressures (so-called low-pressure-area), so that for the press process no elevated temperatures are necessary and, as no re-cooling is needed, the press device is soon free for a new load.

The following examples will further illustrate the invention and enable persons skilled in the art to understand the invention more completely. It is understood, however, that the examples are illustrative only and that the invention is not limited to the specific examples recited.

Example I

Five hundred kilograms of melamine-formaldehyde-precondensate (mol ratio 1:1.7, precipitation point=3.0) were dissolved in 500 liters of water and admixed with 100 kg. of a 50% solution of polyvinyl alcohol having a saponification number of 140. To this mixture, 55.0 kg. of ethylene glycol were added. A white paper filled with titanium dioxide of 80 gm./m.$^2$ weight was impregnated with this solution and dried at a temperature of 120° C. A resin absorption of 140%, based on weight of paper, was obtained. The paper thus obtained was pressed onto woodchip mold sheets for 7 minutes at a pressure of 12 kg./cm.$^2$. Temperatures of 120, 130, 140 and 150° C. were used to form the laminates. In each case transparent surfaces were obtained, which could be detached from the plates without any adherence.

Example II

Example I was repeated, with the difference that instead of 100 kg., only 50.0 kg. of the 50% polyvinyl-alcohol solution was used. The results were practically identical as described in Example I.

Example III

Example I was repeated, with the difference that instead of 55.0 kg., 110 kg. of ethylene glycol were used. Practically identical results as in Example I were obtained.

Example IV

An impregnation solution according to Example I was prepared and a highly bleached cellulose paper of 25 gm./m.$^2$ weight was impregnated with this solution. The absorption of resin amounted to 270%, based on the weight of the paper. The paper, dried at a temperature of 130° C., was pressed, under a pressure of 12 kg./cm.$^2$ at 150° C., for 10 minutes onto plywood. A highly transparent surface was obtained, which showed the natural wood grain very distinctly.

Example V

Five hundred kilograms of melamine-formaldehyde-precondensate (mol ratio=1:1.6, precipitation point=4.0) were dissolved in 500 liters of water and admixed with 100 kg. of a 50% solution of polyvinyl alcohol having a saponification number of 110. Next, 45 kg. of ethylene glycol were added to the solution. Papers, printed with an elm pattern and weighing 150 gm./m.$^2$ were impregnated with this solution and dried at a temperature of 130° C. The paper thus obtained was pressed onto woodchip mold sheets for 7 minutes under a pressure of 12 kg./cm.$^2$. Transparent surfaces were obtained, which could be detached from the plates without adhering to same.

Example VI

Five hundred kilograms of melamine-formaldehyde-precondensate (mol ratio=1:1.6, precipitation point=6.0) was dissolved in 500 liters of water and admixed with 80 kg. of a 50% solution of polyvinyl alcohol with a saponification number of 78. To this solution 50 kg. of ethylene glycol were added and papers weighing 120 gm./m.$^2$ and printed with a walnut pattern were impregnated with the solution obtained. The drying was carried out at a temperature of 120° C., and a resin absorption of 140%, based on the weight of the paper, was achieved. The papers thus obtained were pressed onto plywood sheets for 8 minutes under a pressure of 10 kg./cm.$^2$. Transparent surfaces were obtained, which could be removed from the plates without any adherence.

While certain specific examples and preferred modes of practice of the invention have been set forth it will be understood that this is solely for the purpose of illustration and that various changes and modifications may be made without departing from the spirit of the disclosure and the scope of the appended claims.

We claim:
1. An aqueous bonding solution consisting essentially of (1) an aqueous solution of a melamine-formaldehyde precondensate, said precondensate having a mol ratio of melamine to formaldehyde of about 1:1.5 to 1:2.5 and a precipitation point of from about 10 to 1 (2) from about 2% to 20% by weight, based on the solid precondensate content, of a polyvinyl alcohol having a saponification number of from 50 to 250, and (3) from about 1% to 10% by weight, based on the weight of the above mixed precondensate solution of a lower poly-hydric alcohol having from 2 to 6 carbon atoms, said bonding solution containing from about 20% to 60% by weight of water.

2. A solution according to claim 1, wherein said lower poly-hydric alcohol is selected from the group consisting of propanediol, butanediol, glycerin, diethylene glycol, mannitol, sorbitol and ethylene glycol.

3. A solution according to claim 1, wherein said lower poly-hydric alcohol is ethylene glycol.

4. In a process for preparing laminates comprising impregnating papers with a bonding solution, drying the impregnated papers and pressing the dried papers onto sheets, the improvement which comprises using an aqueous bonding solution consisting essentially of (1) an aqueous solution of a melamine-formaldehyde precondensate, said precondensate having a mol ratio of melamine to formaldehyde of about 1:1.5 to 1:2.5 and a precipitation point of from about 10 to 1 (2) from about 2% to 20% by weight, based on the solid precondensate content, of a polyvinyl alcohol having a saponification number of from 50 to 250, and (3) from about 1% to 10% by weight, based on the weight of the above mixed precondensate solution of a lower poly-hydric alcohol having from 2 to 6 carbon atoms, said bonding solution containing from about 20% to 60% by weight of water.

5. A process according to claim 4, wherein said lower poly-hydric alcohol is selected from the group consisting of propanediol, butanediol, glycerin, diethylene glycol, mannitol, sorbitol and ethylene glycol.

6. A process according to claim 5, wherein said lower poly-hydric alcohol is ethylene glycol.

7. The product produced by the process of claim 4.

References Cited

UNITED STATES PATENTS

| | | | |
|---|---|---|---|
| 2,755,198 | 7/1956 | Stewart | 260—29.4 |
| 2,920,984 | 1/1960 | Moynihan | 260—29.4 |
| 2,930,727 | 3/1960 | Baranyi | 260—29.4 |

MURRAY TILLMAN, Primary Examiner

M. J. TULLY, Assistant Examiner

U.S. Cl. X.R.

161—258, 261, 263; 260—33.4